United States Patent [19]

Ingels

[11] 4,365,419
[45] Dec. 28, 1982

[54] ALIGNMENT DEVICE FOR MACHINE HEAD

[76] Inventor: Luis Ingels, 242 S. Irwindale, Azusa, Calif. 91702

[21] Appl. No.: 225,017

[22] Filed: Jan. 14, 1981

Related U.S. Application Data

[63] Continuation-in-part of Ser. No. 47,369, Jun. 11, 1979, abandoned.

[51] Int. Cl.³ .............................................. G01B 5/24
[52] U.S. Cl. ................................. 33/185 R; 33/174 H
[58] Field of Search ............ 33/169 C, 172 D, 174 Q, 33/174 M, 181 R, 185 R, 1 N, 174 H

[56] References Cited

U.S. PATENT DOCUMENTS

| | | | |
|---|---|---|---|
| 685,288 | 10/1901 | Miller | 33/172 D |
| 711,763 | 10/1902 | Fox et al. | 33/172 D |
| 1,424,310 | 8/1922 | Krebs | 33/172 D |
| 2,134,062 | 10/1938 | Trbojevich | 33/174 H |
| 2,384,058 | 9/1945 | Whitmore | 33/172 D |
| 3,542,323 | 11/1970 | Arnold | 33/172 D |
| 3,711,955 | 1/1973 | Holt | 33/181 R |
| 3,763,570 | 10/1973 | Andersen | 33/185 R |

FOREIGN PATENT DOCUMENTS

| | | | |
|---|---|---|---|
| 928649 | 12/1947 | France | 33/174 H |
| 569002 | 5/1945 | United Kingdom | 33/174 H |
| 277273 | 10/1970 | U.S.S.R. | 33/185 R |
| 623709 | 9/1978 | U.S.S.R. | 33/174 Q |

Primary Examiner—Richard R. Stearns
Attorney, Agent, or Firm—Donald D. Mon

[57] ABSTRACT

A device and method for aligning the machine head of machines such as milling machines. A disk having a lapped flat surface is to be attached to the spindle of the machine, and the axis of the spindle can readily and accurately be set perpendicular to the two milling machine table axes. A hub is attached to the disk, with an axis vertical to the flat surface. The hub is used to attach the disk to the spindle. The disk has a plurality of equally spaced indicia around near its edge so that the high point and low point can be determined by placing a feeler gage on the machine table and tracking the flat surface. An axis accurately perpendicular to the machine head axis (spindle axis) will exist half-way between the high and low points on the edge disk as determined by the feeler gage. The machine head may now be accurately adjusted relative to the table by adjusting it so that a feeler gage shows no variation when the said perpendicular axis is tracked in the two milling machine table axial directions. Lightly magnetized angle blocks may also be provided to set the spindle to any angle after a particular alignment has been completed.

31 Claims, 7 Drawing Figures

ALIGNMENT DEVICE FOR MACHINE HEAD

CROSS REFERENCE TO OTHER APPLICATION

This application is a continuation-in-part of applicant's co-pending United States patent application Ser. No. 047,369, filed June 11, 1979, entitled "Alignment Device for Machine Head", now abandoned.

FIELD OF THE INVENTION

This invention relates to a method and a tool for accurately aligning the cutting head of machines such as milling machines.

BACKGROUND OF THE INVENTION

The machining of parts of tools requires accurate adjustment of the machine head of a machine tool if close tolerances are to be maintained. Previously, head adjustments were very difficult to make and required numerous measurements involving a great deal of time. Further, once the alignment had been completed there was great fear of moving the milling head because of the re-alignment difficulty. One such method of aligning the heads comprises placing an accurately flat surface on the machine table and measuring the change in distance from the cutting head to the flat surface as it moves relative to the surface of the surface. The flat surface would be traversed in one direction and accurate adjustments made and then traversed in another direction to align the machine along a second axis. However, this method did not compensate for variations caused by misalignment of the collet, spindle and head.

BRIEF DESCRIPTION OF THE INVENTION

The present invention eliminates the fear of moving the milling head, improves accuracy and saves time by allowing adjustment simply by removing the cutter and replacing it with a disk having an accurate lapped flat surface. The disk is provided with an accurate vertical hub or post for attaching collets such as $\frac{1}{2}''$ or $\frac{3}{4}''$. Once installed, the disk may be rotated and a feeler gage positioned on the machine table can track the surface of the disk near its edge. With this method the high and low points on the disk caused by irregularities such as misalignment of the collet spindle may be determined. From this information, determination of a neutral axis accurately perpendicular to the machine head may be determined by finding the points on the surface of the disk near its edge half-way between the high and the low points. The final adjustment is then made by tracking the disk neutral axis from the edge of the disk to the hub by moving the machine table. The head may then be adjusted for minimum or no variation between the edge of the disk and the hub.

To determine accurately the high and the low points around the edge of the disk indicia are provided near the edge of the disk. The disk can also be used for aligning other devices such as drills by inserting the hub in a drill chuck. However, the alignment of a drill chuck requires a little more care to be sure all the chuck jaws are clean and that the jaws clamp evenly on the disk hub.

Another advantage of this device is the ability to indicate excessive errors due to defects and damage to the collet spindle indicating that these parts need replacement. The disk method described can be used for aligning any axis chosen in the same manner as described hereinabove. In a milling machine the invention would be used to adjust one axis, such as the longitudinal axis, and then by applying the same steps described above adjustment of the transverse axis can next be accomplished.

The disk can also be used with preset angle blocks individually or in combinations to set the spindle to any angle between 0° and 45°. The angle blocks are made in sets with included angles of $\frac{1}{2}°$, 1°, 2°, 3°, 5°, 10°, 15°, 20° and 30° so that angle increments of $\frac{1}{2}°$ can be established by combining them. The angle blocks are lightly magnetized to hold their position on the disk and are rotationally positioned on the disk by a holder placed around the hub of the disk and guided by the disk edge.

The principal object of the invention is to provide a simple time-saving accurate device and method for adjusting cutting heads on machines such as milling machines.

These objectives are attained by provision of a disk having an accurate lapped, flat surface for attachment directly to the cutter head to allow simple, easy adjustment.

Other objects and advantages will be apparent from the following explanation when considered in conjunction with the accompanying drawings.

DESCRIPTION OF THE PREFERRED EMBODIMENT

Figure 1:
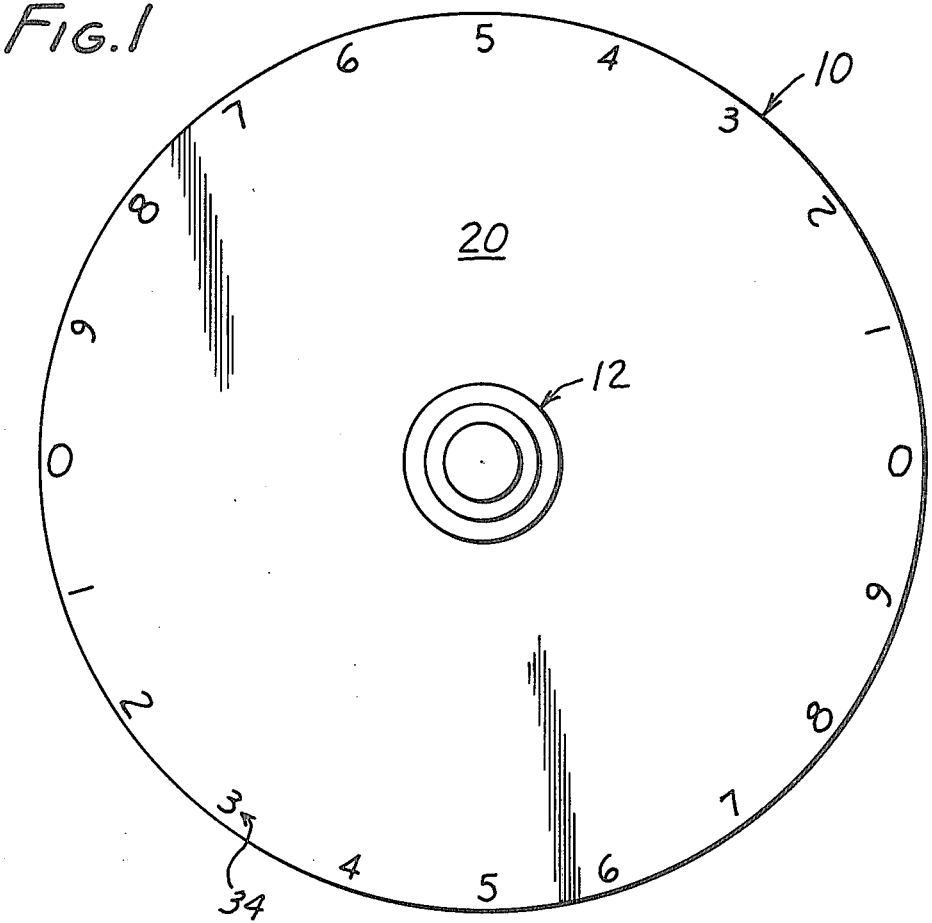
FIG. 1 is a top view of the disk having a lapped flat surface.
Figure 2:
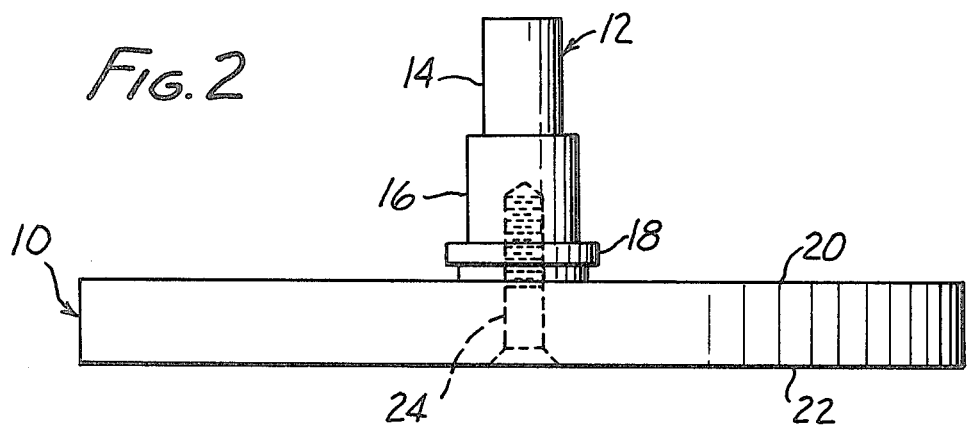
FIG. 2 is a side elevation of the disk illustrating the hub.

The disk 10 is illustrated in FIG. 1 and has a lapped flat surface 20 and a hub 12 for attaching the disk 10 to the head of a machine such as a milling machine. The hub 12 has stepped shank having different size or diameter portions 14 and 16 and an abutting shoulder 18 for engaging the end of a collet for accurate clamping. Portion 14 with the smaller diameter, for example, will be $\frac{1}{2}$ inch in diameter for that sized collets, while portion 16 with the larger diameter will have a $\frac{3}{4}$ inch diameter for that sized collets.

Figure 3:
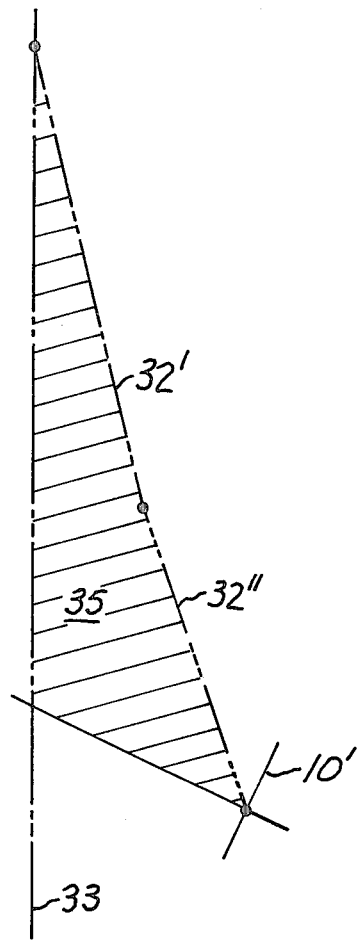
FIG. 3 is a diagram illustrating the principle of the invention.

The flat surface 20 of the disk 10 will be lapped accurately flat for determining an accurate neutral axis perpendicular to the axis of the machine head. The bottom surface 22 may or may not be lapped flat. The hub 12 is attached to the disk 10 by a counter sunk flat head machine screw 24 and its axis is accurately oriented vertically with respect to flat surface 20 of the disk 10. A plurality of equally spaced reference numbers or indicia 34 are provided on the flat surface around the edge of the disk 10. The principle of the invention is illustrated in FIG. 3 with respective axes misalignment greatly exaggerated for illustration purposes only. At some angle of rotation of the spindle, the spindle axis 32, collet axis 32'' and the true vertical axis 33 will all be in the same plane 35 (i.e. coincident plane). The neutral axis being sought on the surface 20 of the disk 10 will of course lie in the plane perpendicular to this plane. By using the disk 10 of this invention in the manner hereinafter described the neutral axis 10' on surface 20 can easily and quickly be determined and the machine head 32 adjusted to eliminate errors in the misalignment of the respective axes.

Figure 4:
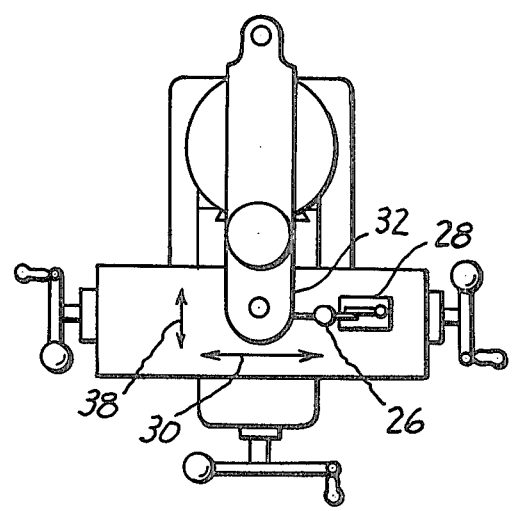
FIG. 4 is a semi-schematic top elevation view of a milling machine illustrating the method alignment.
Figure 5:
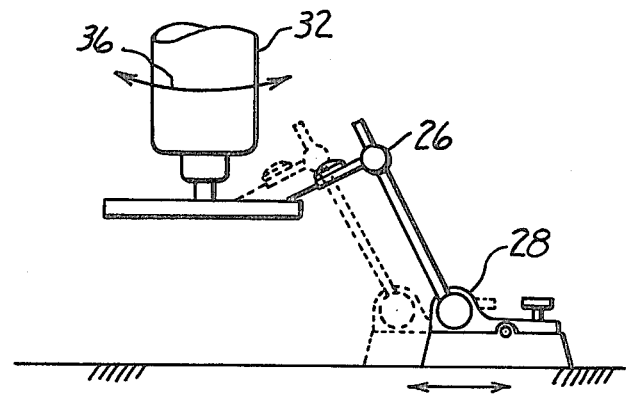
FIG. 5 further illustrates the alignment of the cutting head of a machine.

The method of aligning a machine head 32 using this principle is illustrated in FIGS. 4 and 5. The disk 10 is inserted into the collet, either ½ or ¾ inch, of a machine head and firmly clamped by it. Feeler gage 26 which is preferably a dial-indicating feeler gage is positioned on the machine table 28 facing the axis 30 desired to be set. The spindle of the machine head 32 is turned and the disk 10 thereby rotated while a feeler gage 26 tracks the edge of the lapped flat surface 20. The feeler gage 26 will indicate a high and low point on the edge or periphery on the disk which may be caused by misalignment of the collet, spindle. The neutral accurate perpendicular axis desired can then be determined by rotating the disk 10 to the half-way point between the high and low point on the edge of the disk 10.

For example, referring to FIG. 1 there are equally spaced indicia indicated at 34 around the edge of the disk for determining the high and low points. Thus, for example, if the high point and low points were at 0-0 respectively then the half-way point would be at indicia 5 on opposite sides of the disk 10. The disk 10 is then rotated until the feeler gage is at the point 5 on either side of the disk. Thus the accurate neutral perpendicular axis on the lapped flat surface 20 of the disk 10 will be a line between 5-5 on the disk.

Now to set the machine head 32 for accurate tracking during movement of the table the feeler gage 26 is moved from point 5 at the edge of the disk to the hub 12 and back with the machine head being adjusted along the axis, indicated at 36, for minimum or no variation of the feeler gage 26. When there is no variation on the dial indicator of the feeler gage the machine head 32 may be locked. This procedure may then be followed for the other axis, in this case the traverse axis 38. If the bottom 22 of the disk 10 is also a lapped flat surface the machine table can be moved across the entire disk by tracking the bottom surface 22 if desired.

Figure 6:
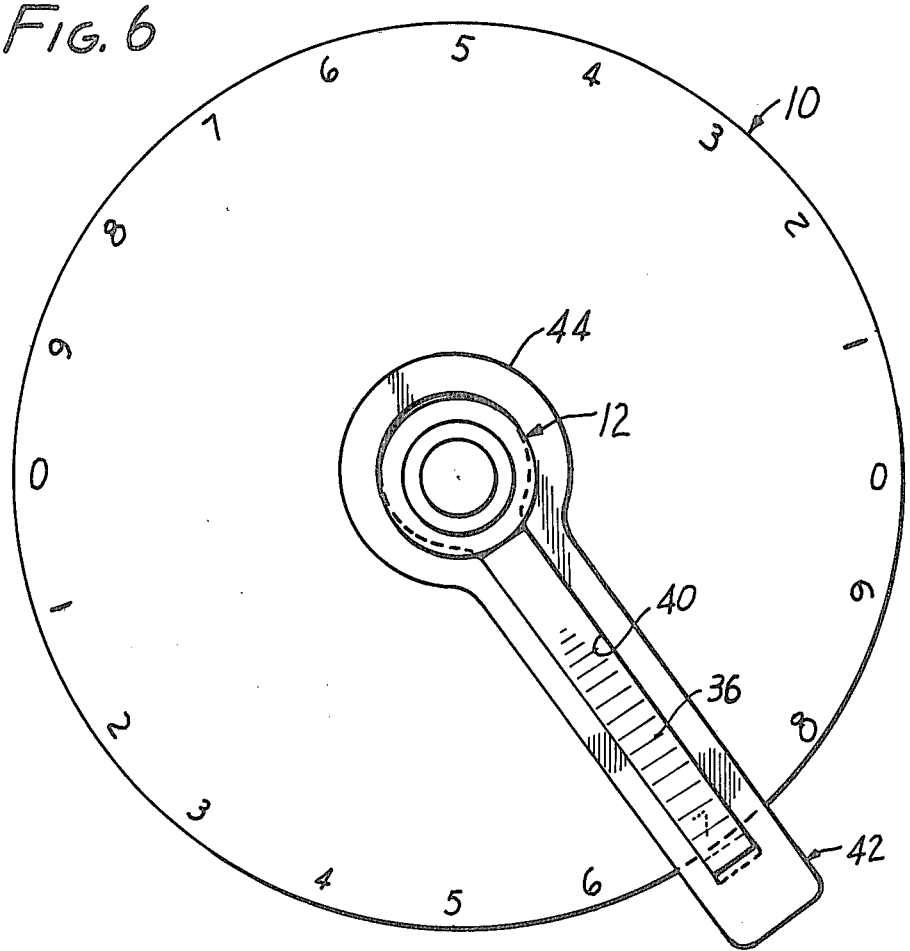
FIGS. 6 and 7 illustrate the use of the alignment disk with optional angle setting blocks.
Figure 7:
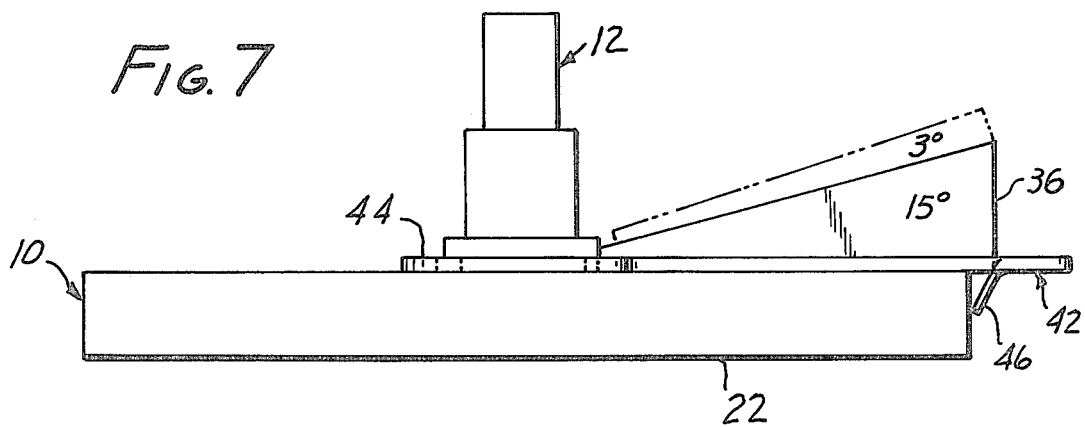

After setting up the spindle with the alignment device any angle between 0°–45° may be achieved by using preselected angle setting blocks as shown in FIGS. 6 and 7. The disk 10 is aligned as previously described and an angle setting block 38 is set in the slot 40 of an angle setting block holder 42. The block holder 42 has a socket 44 at the end which fits the hub 12 of the disk and an edge guide 46 at the other end. The angle setting blocks are lightly magnetized for better holding on the disk and are provided in incremental sizes of ½°,1°,2°,3°,5°,10°,15°,20° and 30° so angles in increments of ½° from ½° to 45° can be established.

To use the angle setting blocks the disk is first used to set up the spindle to the particular alignment desired. The particular spindle angle is determined and the blocks or blocks necessary to establish the angle are placed in the slot 40 of the block holder 42. For example, the 15° and 3° blocks can be compounded as shown in FIG. 7 to establish an angle of 18°. The angle setting block holder may now be used to rotate the blocks to the particular radial position desired and the spindle moved to the angle required the dial indicator is used to set the precise angle desired.

Thus, with a disk having an accurate lapped flat surface and using the method described, machine heads can be quickly and accurately aligned. This will eliminate fear of moving the milling head, improving accuracy and saving time because the head can be easily and accurately adjusted merely removing the cutter and using the disk as described above.

This invention is not to be limited to the embodiments shown in the drawings and described in the description which are given by way of example and not of limitation, but only in accordance with the scope of the appended claims.

I claim:

1. A device for aligning the cutting head of a machine comprising:
    a disk having a flat surface;
    means including a hub attached to said disk, said hub having an axis accurately perpendicular to said flat surface, for attaching said disk to said machine head; and indicia means around the periphery of said flat surface for use in determining the location of an axis on said disk perpendicularly accurate to said machine head axis, whereby said machine head may be accurately aligned with the machine table by traversing said last-named axis.

2. The device according to claim 1 wherein said hub comprises a stepped shank for adapting said device to variable sized collets.

3. The device according to claim 1 wherein said hub includes an abutting shoulder for abutting end of the collet jaws to assure even clamping of said hub in said collet.

4. The device according to claim 1 wherein said indicia means comprises a plurality of equally spaced indicia near the edge of said disk whereby the high point and low point at opposite edges of said disk may be accurately determined.

5. The device according to claim 4 wherein there are 20 indicia equally spaced at 18 degrees around the edge of said disk.

6. The device according to claim 4 wherein a feeler gage is provided to be positioned on said machine table for tracking the surface of said disk to determine said high and low points.

7. The device according to claim 6 wherein said feeler gage is a dial indicating type gage.

8. The device according to claim 1 including:
    means for setting said machine head to a predetermined angle after alignment of said machine head with said table.

9. The device according to claim 8 in which said means for setting the machine head to a predetermined angle comprise:
    one or more preset angle blocks adapted to be set on said flat surface; and
    means for radially positioning said angle blocks.

10. The device according to claim 9 in which said preset angle blocks are provided in increments such that they can be compounded to set the machine head at ½° angle increments between ½ to 45°.

11. The device according to claim 10 in which said preset angle blocks are provided in increments of ½°, 1°, 2°, 3°, 5°, 10°, 15°, 20° and 30°.

12. The device according to claim 10 in which said angle blocks are magnetized to hold their position when placed on said disk.

13. The device according to claim 9 in which said means for positioning said blocks comprises an angle block holder having a slot in which said blocks are placed; said angle block holder having a socket fitting a hub on said disk, and an edge guide, whereby said angle block holder can be rotated to position said angle blocks radially on said disk.

14. A method of aligning a cutting head of a machine comprising:
attaching to said cutting head a disk having a flat surface so that said flat surface is perpendicular to the axis of said machine head;
rotating said disk and machine head around said axis;
detecting a high and a low point on the flat surface near the edge thereof;
determining a neutral axis at points on opposite edges of said disk half-way between the high and low points;
adjusting the machine head for minimum variation of the distance between the flat surface and the table of the machine over the said surface.

15. The method according to claim 14 wherein the step of detecting the high and low points comprises;
positioning a feeler gage on the machine table; and
tracking the flat surface of said disk with said feeler gage during rotation of said disk.

16. The method according to claim 14 including:
placing one or more preset angle blocks on said disk to provide a particular selected angle after initial alignment of said cutting head;
positioning said preset angle blocks radially; and
re-adjusting the machine head to the angle of said preset angle blocks.

17. The method according to claim 16 in which said angle blocks are selected to provide angles in increments of $\frac{1}{2}°$ between $\frac{1}{2}°$ and 45°.

18. The method according to claim 17 in which said angle blocks are selected and compounded from angle blocks provided in increments of $\frac{1}{2}°$, 1°, 2°, 3°, 5°, 10°, 15°, 20° and 30°.

19. An alignment device comprising:
a disk, said disk having an accurately flat surface;
post means on said disk for accurately securing said disk perpendicular to the axis of a collet;
indicia means around the periphery of said disk, said indicia being equally spaced;
sensing means on a table attached to said machine for sensing variations in spacing from said table to the point of contact of the sensing means to said flat surface while the disk is rotated;
whereby an axis to be traversed by a machine cutting head may be adjusted to be horizontally accurate.

20. The alignment device according to claim 19 wherein said post means is adapted to accomodate a variety of collets.

21. The device according to claim 19 wherein there are 20 equally spaced indicia around the periphery of said disk.

22. The device according to claim 19 wherein said post means includes a flange seat to assure proper alignment of said disk in said collet.

23. The device according to claim 19 including: means for setting said machine head to a predetermined angle after alignment of said machine head with said table.

24. The device according to claim 23 in which said means for setting the machine head to a predetermined angle comprises:
one or more preset angle blocks adapted to be set on the lapped flat surface; and
means for radially positioning said angle blocks.

25. The device according to claim 24 in which said preset angle blocks are provided in increments such that they can be compounded to set the machine head at $\frac{1}{2}°$ angle increments between $\frac{1}{2}°$ and 45°.

26. The device according to claim 25 in which the preset angle blocks are provided in increments of $\frac{1}{2}°$, 1°, 2°, 3°, 5°, 10°, 15°, 20° and 30°.

27. The device according to claim 25 in which said angle blocks are magnetized to hold their position when placed on said disk.

28. The device according to claim 24 in which said means for positioning said blocks comprises an angle block holder having a slot in which said blocks are placed; said angle block holder having a socket fitting a hub on said disk, and an edge guide, whereby said angle block holder can be rotated to position said angle blocks radially on said disk.

29. A method of aligning a machine head of a machine apparatus comprising:
attaching an accurately flat circular surface perpendicular to said machine head;
rotating said accurately flat surface with said machine head to determine the high and low points relative to the machine table around the periphery of said flat circular surface whereby a neutral perpendicular axis may be determined;
adjusting said accurately flat surface to be parallel with the neutral axis determined from the high and low points;
traversing the predetermined neutral axis on said flat surface from a table attached to said machine with sensing means;
adjusting the cutting head of the machine to a position wherein the sensing means tracks said predetermined neutral axis on said flat surface with a minimum of variation.

30. The method according to claim 29 in which said angle blocks are selected to provide $\frac{1}{2}°$ angle increments $\frac{1}{2}°$ and 45°.

31. The method according to claim 30 in which said angle blocks are selected and compounded from angle blocks provided in increments of $\frac{1}{2}°$, 1°, 2°, 3°, 5°, 10°, 15°, 20° and 30°.

* * * * *